US012571504B2

(12) United States Patent
Alabdulgader

(10) Patent No.: US 12,571,504 B2
(45) Date of Patent: Mar. 10, 2026

(54) FLUID INJECTION SYSTEM FOR PIPELINES

(71) Applicant: SAUDI ARABIAN OIL COMPANY, Dhahran (SA)

(72) Inventor: Omar Sami Alabdulgader, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 651 days.

(21) Appl. No.: 18/056,612

(22) Filed: Nov. 17, 2022

(65) Prior Publication Data

US 2024/0167639 A1 May 23, 2024

(51) Int. Cl.
*F17D 3/12* (2006.01)

(52) U.S. Cl.
CPC .................................... *F17D 3/12* (2013.01)

(58) Field of Classification Search
CPC ........................................................ F17D 3/12
See application file for complete search history.

(56) References Cited

U.S. PATENT DOCUMENTS

| | | | | |
|---|---|---|---|---|
| 3,342,193 | A | 9/1967 | Deering et al. | |
| 6,165,372 | A | 12/2000 | Ziemar et al. | |
| 6,834,664 | B1 * | 12/2004 | Chiang | F17D 3/12 137/341 |
| 7,137,569 | B1 | 11/2006 | Miller et al. | |
| 2014/0177380 | A1 | 6/2014 | Matula | |
| 2016/0263537 | A1 | 9/2016 | Kenreck, Jr. et al. | |

* cited by examiner

*Primary Examiner* — Thuan D Dang
(74) *Attorney, Agent, or Firm* — Vorys, Sater, Seymour and Pease LLP

(57) ABSTRACT

Disclosure herein includes a pipeline system that includes a pipeline including an upstream pipeline section and a downstream pipeline section, and an injection system interposing the upstream and downstream pipeline sections and including an annular body operatively coupled to the upstream and downstream pipeline sections, an injection chamber defined within a sidewall of the annular body, an external reservoir in fluid communication with the injection chamber, and one or more nozzles provided on the annular body and in fluid communication with the injection chamber. An injection fluid is injected into an interior of the pipeline via the one or more nozzles to mix with a fluid flowing within the pipeline.

20 Claims, 2 Drawing Sheets

FLUID INJECTION SYSTEM FOR PIPELINES

FIELD OF THE DISCLOSURE

The present disclosure relates generally to the injection of fluids into a pipeline and, more particularly, to an injection system operable to inject a chemical directly into the interior of the pipeline from a sidewall of the pipeline.

BACKGROUND OF THE DISCLOSURE

The oil and gas industry employs carbon steel in a variety of applications, such as piping and pipelines for the transport of corrosive fluids, e.g., liquid and gaseous hydrocarbons. Over time, the passage of gas with corrosive properties, as well as sweet and sour crude oil, causes corrosion of the pipes and pipelines through which they pass.

The industry has long recognized that chemical injection is an essential and efficient component of the corrosion management plan necessary for hydrocarbon producing assets. Chemical injections include the infusion of corrosion inhibitors that create a film or layer on the internal surfaces of the pipeline such that a barrier is formed between the material of the pipeline and the flowing corrosive fluids.

One method of chemical injection uses an injection quill, which is a mechanical device that is inserted into a pipe, pipeline, orifice, or otherwise, and serves as a medium through which chemicals can be injected. The quill extends into the pipeline and deploys the chemical into the center of the fluid flow, which subjects the quill to the pressures of the pipeline and causes a hindrance to fluid flow.

Quill injection systems are tailored to withstand the pressure environments to which they are deployed, but use of such quill injection systems does present challenges. Because the injection quill remains in place during hydrocarbon flow, the quill itself is subject to corrosion and erosion. In some cases, the discharge orifice of the quill fails, resulting in concentrated volumes of chemical being released without control and at high velocities, which results in inconsistent application of the corrosion inhibitor. Additionally, such uncontrolled releases can damage the internal diameter of the pipeline where it is subject to continuous, high velocity flow. The end result is an inconsistent pipe internal diameter which prevents proper pipeline maintenance and inspection by use of industry standard methods.

For the foregoing reasons, there is a need for an apparatus that permits uniform chemical injection without itself being subject to corrosion and erosion.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a pipeline system may include an upstream and downstream pipeline section as well as a fluid injection system. The injection system consists of an annular body that is coupled between the upstream and downstream pipeline sections, and the annular body may contain one or more injection chambers within its sidewalls. The injection system may further include an external fluid reservoir fluidly connected with the injection chamber of the annular body. At least one or more nozzles may be located within the annular body and it is through the nozzle(s) that fluid is injected from the injection chamber and into the interior of the pipeline, permitting the injection fluid to mix with the fluid flowing within the pipeline.

According to another embodiment consistent with the present disclosure, a fluid injection system for a pipeline includes an annular body that can be coupled between upstream and downstream pipeline sections. The annular body may provide one or more injection chambers within its sidewalls. The injection system further includes an external fluid reservoir that is fluidly connected with the injection chamber of the annular body. At least one or more nozzles may be located within the annular body and it is through the nozzle(s) that fluid can be injected from the injection chamber and into the interior of the pipeline, permitting the injection fluid to mix with the fluid flowing within the pipeline.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
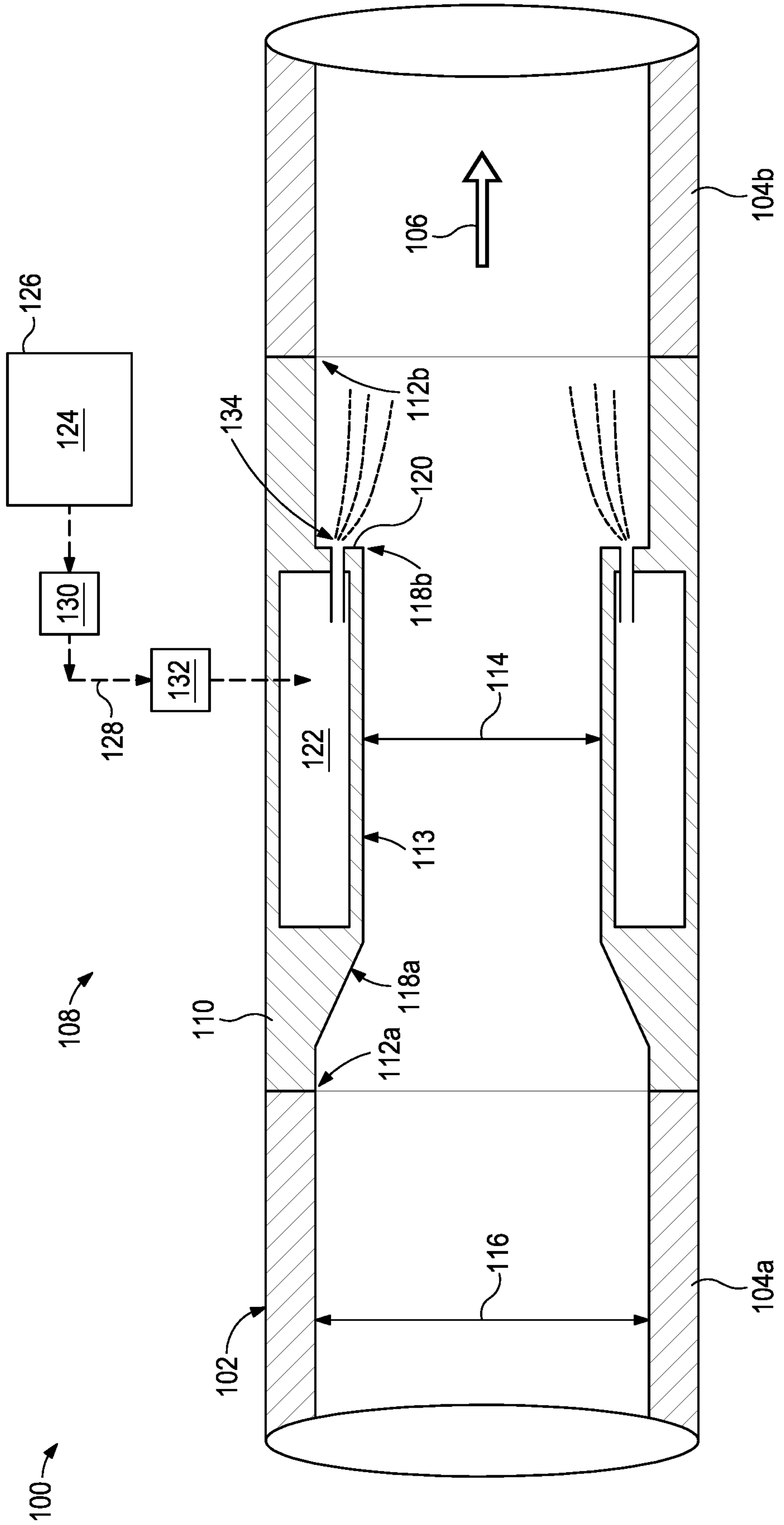
FIG. 1 is a schematic, cross-sectional side view of an example pipeline system according to one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to the injection of fluids into a pipeline and, more particularly, to an injection system operable to inject a chemical directly into the interior of the pipeline from a sidewall of the pipeline. The injection systems disclosed herein may be configured to inject various types of fluids into pipelines. In some applications, the injection systems described herein may be configured to inject a chemical inhibitor configured to help mitigate pipe corrosion. The embodiments described herein can be advantageous over conventional quill injection methods since the injection systems of the present disclosure entirely eliminate the need for quill placement within the pipeline, thus removing a pipeline restriction/obstruction. More particularly, injection quills create an unpassable pipeline restriction hindering required inspection and cleaning operations. While quills can be removed and retracted, this is often accomplished manually, resulting in increased labor, time and cost. With no quill in place, pipeline inspection and cleaning is uninterrupted, resulting in a time and cost savings. Additionally, because an injection quill is subject to the risk of corrosion and erosion and therefore leakage, extensive manual quill inspection is required. Eliminating the quill eliminates the need for quill inspection. Use of the injection system disclosed herein may result in a more uniform inhibitor application, thus providing better corrosion protection to the pipeline walls.

FIG. 1 is a schematic, cross-sectional side view of an example pipeline system 100 that may incorporate the principles of the present disclosure. As illustrated, the pipeline system 100 (hereafter "the system 100") includes a pipeline 102 that may be made up of a plurality of pipes, tubes, conduits, or flow lines coupled end-to-end. In the illustrated embodiment, for example, the pipeline 102 includes an upstream pipe section 104*a* and a downstream pipe section 104*b*. Each pipe section 104*a,b* may comprise a tubular length of a rigid material, such as carbon steel.

The pipeline 102 may be used to convey (transport) one or more pipeline fluids 106, which may comprise a liquid, a gas, or a combination of one or more liquids and one or more gases (i.e., a multiphase fluid). In one or more embodiments, the pipeline fluid 106 may comprise a fluid commonly conveyed in pipes or pipelines pertaining to the oil and gas industry, but could alternatively comprise fluids conveyed in other industries. Moreover, the pipeline fluid 106 may constitute a corrosive fluid, or otherwise a fluid having particular chemical properties that might exhibit a corrosive or debilitating effect on the pipeline 102. Examples of the pipeline fluid 106 include, but are not limited to, a hydrocarbon (e.g., crude oil, natural gas, etc.), an aqueous acid (e.g., an acidizing fluid), an acid gas (e.g., carbon dioxide or hydrogen sulfide in a fluid phase), a salt solution, a produced water, a refined product including but not limited to gasoline, jet fuel, diesel fuel, or any combination thereof.

The system 100 further includes an injection system 108 configured and otherwise operable to inject one or more fluids into the pipeline 102 for various applications. In one application, for example, the fluid injected into the pipeline 102 may comprise a corrosion inhibitor designed to help mitigate or prevent corrosion of the pipeline 102. As illustrated, the injection system 108 includes a generally annular body 110 that interposes the upstream and downstream pipe sections 104*a, b*. In some embodiments, the annular body 110 may comprise a section of pipe or tubing similar to the upstream and downstream pipe sections 104*a,b*. In such embodiments, a first or "upstream" end 112*a* is coupled to the upstream pipe section 104*a*, and a second or "downstream" end 112*b* is coupled to the downstream pipe section 104*b*. In other embodiments, however, the annular body 110 need not comprise pipe or tubing similar to the pipe sections 104*a,b*, but may merely comprise a length of pipe or tubing capable of interposing the pipe sections 104*a,b*. The annular body 110 may be coupled to the pipe sections 104*a,b* using any known means of pipe coupling such as, but not limited to, threading, opposing flanges, welding, or any combination thereof.

In some embodiments, the annular body 110 may be constructed of the same material as the pipeline 102 (i.e., the pipe sections 104*a,b*). In other embodiments, however, the body 110 may be made of other rigid materials capable of withstanding the pressures, temperatures, and flow rates to which the annular body 110 will be subjected. For example, the annular body 110 may be constructed of a rigid, corrosion-resistant material, such as a metal (e.g., nickel, a nickel alloy, titanium, or titanium alloy), a polymer, a composite material, without departing from the scope of the disclosure.

In some embodiments, the annular body 110 has the same or substantially the same outer diameter as one or both of the pipe sections 104*a,b*, but could alternatively exhibit a larger outer diameter. Similarly, in some embodiments, the annular body 110 may exhibit the same or substantially the same inner diameter as one or both of the pipe sections 104*a,b*, but could alternatively exhibit a smaller inner diameter, without departing from the scope of the disclosure. In the illustrated embodiment, for example, the injection system 108 includes a raised section 113 that exhibits an inner diameter 114 smaller than an inner diameter 116 of one or both of the upstream and downstream pipe sections 104*a,b*. Accordingly, the raised section 113 extends a short distance into the interior of the annular body 110. In some embodiments, the raised section 113 may form an enlarged part or section of the sidewall of the annular body 110, thus forming an integral part thereof. In other embodiments, however, the raised section 113 may be provided as a separate component part of the injection system 108. In such embodiments, the raised section 113 may be attached to the inner radial surface of the annular body 110 and secured thereto for operation.

The raised section 113 may extend along all or a portion of the length of the annular body 110. In some embodiments, as illustrated, an upstream end 118*a* of the raised section 113 may be angled and otherwise chamfered. The angle of the upstream end 118*a* may be between about 35° and about 55° from the centerline of the annular body 110. This may prove advantageous in not creating a substantial obstruction to the flow of the fluid 106 through the body 110 in the downstream direction. In contrast, in at least one embodiment, a downstream end 118*b* of the raised section 113 may define a radial shoulder 120 that extends substantially perpendicular from the inner radial surface of the annular body 110.

The injection system 108 includes an injection chamber 122 provided or otherwise defined within the sidewall of the body 110, such as within the raised section 113. In some embodiments, the injection chamber 122 comprises an annular or circumferential void space defined within the raised section 113. In such embodiments, the injection chamber 122 may comprise a cylindrical, continuous, and uninterrupted cavity in the form of a ring defined within the raised section 113. In other embodiments, however, the injection chamber 122 may comprise two or more pockets or independent cavities defined within the raised section 113. In such embodiments the two or more cavities may or may not be in fluid communication with each other.

The injection chamber 122 may be configured to receive an injection fluid 124 from an external reservoir 126 to be injected into the interior of the pipeline 102. As illustrated, the injection chamber 122 is fluidly coupled to the external reservoir 126 via one or more delivery conduits 128. The external reservoir 126 may comprise a storage tank or the like configured for housing and otherwise storing the injection fluid 124.

In embodiments where the injection chamber 122 comprises multiple cavities defined in the raised section 113, each discrete cavity may be independently in fluid communication with the external reservoir 126 via corresponding delivery conduits 128. Alternatively, the multiple cavities may be in fluid communication with each other via suitable conduits and plumbing, and in such embodiments, the delivery conduit 128 may communicate with one of the cavities to provide the injection fluid 124 to all of the cavities, without departing from the scope of the disclosure.

The injection system 108 may further include one or more pumps 130 (one shown) configured to convey the injection fluid 124 to the injection chamber 122. In some embodiments, as illustrated, the pump 130 may be arranged in the delivery conduit 126, but in other embodiments the pump 130 could be arranged within the external reservoir 126, without departing from the scope of the disclosure. The pump 130 may be powered by a local power source, and may be in communication with instrumentation and a computer system (not shown) configured to control operation of the pump 130, including pump rates and efficiency. In such embodiments, the pump 130 may be operated as needed to selectively pump the injection fluid 124 to the injection chamber 122 to be injected into the interior the pipeline 202.

The injection system 108 may further include fluid conveyance and monitoring mechanisms 132 used to help monitor and convey the injection fluid 124 to the injection chamber 122. Example fluid conveyance and monitoring mechanisms 132 include, but are not limited to, a pressure gauge, a strainer, a filter, a pressure relief valve, a flow meter, a check valve, a hand valve, and the like. In some embodiments, as illustrated the fluid conveyance and monitoring mechanisms 132 may be arranged within the delivery conduit 128, but could alternatively be external and in communication with the delivery conduit 128.

When it is desired to inject the injection fluid 124 into the interior of the pipeline 102, the pump 130 conveys (pumps) the injection fluid 124 to the injection chamber 122, which pressurizes the injection chamber 122. The injection chamber 122 may be in fluid communication with one or more nozzles 134 configured to eject or discharge the injection fluid 124 from the injection chamber 122 and into the interior the pipeline 102. In some embodiments, the nozzles 134 may be positioned on the radial shoulder 120 provided at the downstream end **118*a* of the raised section 113. In such embodiments, the injection fluid 124 may be discharged from the nozzles 134 in the same direction as the flow of the fluid 106 within the pipeline 102. In such embodiments, the injection fluid 124 and the fluid 106 within the pipeline 102 mix homogeneously because the injection fluid 124 is discharged in the same direction of flow. Alternatively, the nozzles 134 may be positioned at the upstream end 118 of the raised section 113, and may be arranged to discharge the injection fluid 124 into the pipeline in a direction opposite the direction of fluid flow through the pipeline 102**, without departing from the scope of the disclosure.

The injection fluid 124 may comprise a variety of types of fluids (e.g., gases, liquids, multiphase fluids, etc.) desired to be injected into the pipeline 102 for a variety of applications. In some embodiments, for example, the injection fluid 124 may comprise a corrosion inhibitor, and injecting the corrosion inhibitor into the interior of the pipeline 102 may form a stable, adherent film on the internal surface of the pipeline. The film may act as a barrier between the physical structure of the pipeline 102 and the corrosive effects of the fluid 106 flowing therein. More particularly, the corrosion inhibitor provides a barrier between the metal and the corrosive aqueous environment, which prevents the metal from being wetted by water.

In other embodiments, the injection fluid 124 may comprise a chemical solution configured to neutralize or dilute the chemical components of the fluid 106. For example, the injection fluid 106, may include but is not limited to, an amine neutralizer, a de-emulsifier, a scale inhibitor, a water treatment chemical, a hydrate formation inhibitor, a drag reducer, an anti-foam, a biocide, a chemical additive, or any combination thereof. In such embodiments, the chemical solution may be injected into the interior of the pipeline 102 in batches or as a continuous injection.

Figure 2C:
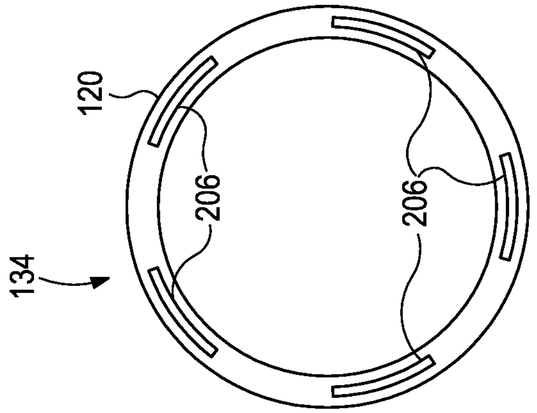
FIGS. 2A-2C are schematic, cross-sectional end views of various examples of the nozzle(s) of FIG. 1, according to various embodiments of the disclosure.
Figure 2B:
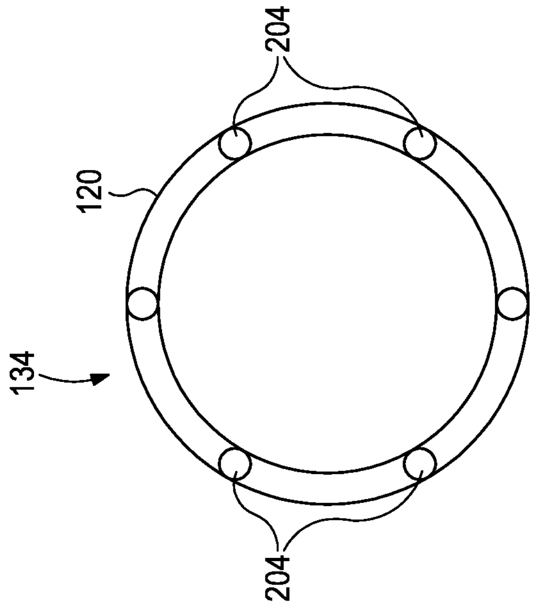
Figure 2A:
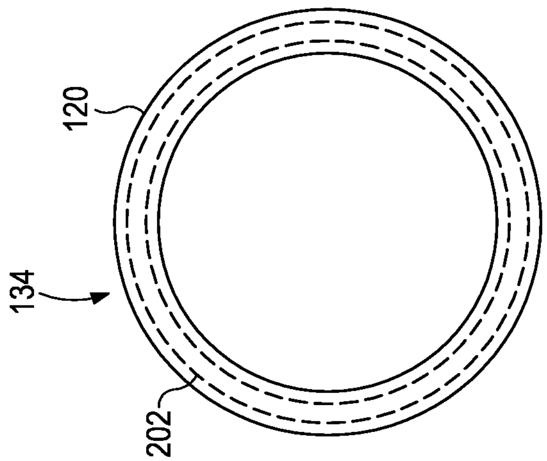

FIGS. 2A-2C are schematic, cross-sectional end views of various examples of the nozzle(s) 134 of FIG. 1, according to various embodiments of the disclosure. As mentioned above, in some embodiments, the nozzle(s) 134 may be provided on the radial shoulder 120 of the raised section 113 (FIG. 1). In some embodiments, the nozzle(s) 134 may be defined by the radial shoulder 120 and otherwise directly formed into the material of the radial shoulder 120. In other embodiments, however, one or more of the nozzle(s) 134 may comprise separate component parts that may be attached to the radial shoulder 120, such as being mechanically attached to corresponding apertures defined in the radial shoulder 120 and sized to receive the nozzle(s) 134.

In FIG. 2A, the nozzle 134 may be constructed as or otherwise comprise a continuous, annular ring 202 provided on and otherwise defined in the radial shoulder 120. In such embodiments, the injection fluid 124 (FIG. 1) will be uniformly injected into the interior of the pipeline 102 (FIG. 1) at all angular orientations (e.g., 360°).

In FIG. 2B, the nozzle(s) 134 may be constructed as or otherwise comprise a plurality of orifices 204. In some embodiments, the orifices 204 may be equidistantly spaced from each other on the radial shoulder 120. In other embodiments, however, the orifices 204 may be non-equidistantly spaced from each other, without departing from the scope of the disclosure. Moreover, while six orifices 204 are depicted in FIG. 2B, more or less than six may be employed, without departing from the scope of the disclosure. Furthermore, in some embodiments, one or more of the orifices 204 may exhibit a different size or diameter as compared to the other orifices 204, and may thus exhibit a different fluid discharge rate.

In FIG. 2C, the nozzle(s) 134 may comprise a plurality of slits 206. Each slit 206 may comprise an arcuate aperture defined in the radial shoulder 120. In some embodiments, the slits 206 may each exhibit the same arcuate length, but may alternatively exhibit different arcuate lengths. Moreover, in some embodiments, the slits may be equidistantly spaced from each other on the radial shoulder 120, but could alternatively be non-equidistantly spaced. Lastly, while five slits 206 are depicted in FIG. 2C, more or less than five may be employed, without departing from the scope of the disclosure.

Referring again to FIG. 1, while the present disclosure describes a single injection system 108 being incorporated into the pipeline system 100, those skilled in the art will readily appreciate that more than one injection system 108 may be employed and strategically placed throughout the entirety of the pipeline system 100. In such embodiments, each injection system 108 may inject the same injection fluid 124 or a different injection fluid 124.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A pipeline system, comprising:
- a pipeline including an upstream pipeline section and a downstream pipeline section; and
- an injection system interposing the upstream and downstream pipeline sections and including:
  - an annular body operatively coupled to the upstream and downstream pipeline sections;
  - an injection chamber defined within a sidewall of the annular body;
  - an external reservoir in fluid communication with the injection chamber; and
  - one or more nozzles provided on the annular body and in fluid communication with the injection chamber,
- wherein an injection fluid is injected into an interior of the pipeline via the one or more nozzles to mix with a fluid flowing within the pipeline.

2. The pipeline system of claim 1, wherein the injection chamber comprises an annular void defined in the sidewall of the annular body.

3. The pipeline system of claim 1, wherein the injection chamber comprises a plurality of discrete cavities and a corresponding one of the one or more nozzles is in fluid communication with each cavity.

4. The pipeline system of claim 1, further comprising a raised section of the sidewall, wherein the injection chamber is defined within the raised section, and wherein an upstream end of the raised section is chamfered and a downstream end of the raised section provides a radial shoulder perpendicular to an inner radial surface of the annular body.

5. The pipeline system of claim 4, wherein the one or more nozzles are provided on the radial shoulder and discharge the injection fluid into the interior in a same direction as a flow of the fluid within the interior.

6. The pipeline system of claim 5, wherein the one or more nozzles is selected from the group consisting of a continuous annular ring, a plurality of orifices, a plurality of slits, and any combination thereof.

7. The pipeline system of claim 1, wherein the annular body is constructed of a corrosion resistant material.

8. The pipeline system of claim 1, wherein the injection system further includes fluid conveyance and monitoring mechanisms selected from the group consisting of a pressure gauge, a strainer, a filter, a pressure relief valve, a flow meter, a check valve, and a hand valve.

9. An injection system for a pipeline, comprising:
- an annular body configured to be operatively coupled to and interpose upstream and downstream sections of the pipeline;
- an injection chamber defined within a sidewall of the annular body;
- an external reservoir in fluid communication with the injection chamber;
- one or more nozzles provided on the annular body and in fluid communication with the injection chamber,
- wherein an injection fluid is injected into an interior of the pipeline via the one or more nozzles to mix with a fluid within the pipeline.

10. The injection system of claim 9, further comprising a raised section of the sidewall, wherein the injection chamber is defined within the raised section, and wherein the raised section provides a radial shoulder perpendicular to an inner radial surface of the annular body.

11. The injection system of claim 10, wherein the one or more nozzles are provided on the radial shoulder and discharge the injection fluid into the interior in a same direction as a flow of the fluid within the interior.

12. The injection system of claim 11, wherein the one or more nozzles is selected from the group consisting of a continuous annular ring, a plurality of orifices, a plurality of slits, and any combination thereof.

13. The injection system of claim 10, wherein an upstream end of the raised section is chamfered.

14. The injection system of claim 9, wherein the injection fluid is selected from the group consisting of a corrosion inhibitor, an amine neutralizer, a de-emulsifier, a scale inhibitor, a water treatment chemical, a hydrate formation inhibitor, a drag reducer, an anti-foam treatment, a biocide, a chemical additive, and any combination thereof.

15. The injection system of claim 9, wherein the annular body is constructed of a corrosion resistant material.

16. A pipeline system, comprising:
- a pipeline including an upstream pipeline section and a downstream pipeline section; and
- an injection system interposing the upstream and downstream pipeline sections and including:
  - an annular body operatively coupled to the upstream and downstream pipeline sections;
  - an injection chamber comprising an annular void defined within a sidewall of the annular body;
  - an external reservoir in fluid communication with the injection chamber; and
  - one or more nozzles provided on the annular body and in fluid communication with the injection chamber, wherein an injection fluid is injected into an interior of the pipeline via the one or more nozzles to mix with a fluid flowing within the pipeline.

17. The pipeline system of claim 16, further comprising a raised section of the sidewall, wherein the injection chamber is defined within the raised section.

18. The pipeline system of claim 17, wherein the raised section provides a radial shoulder perpendicular to an inner radial surface of the annular body, and wherein the one or more nozzles are provided on the radial shoulder and discharge the injection fluid into the interior in a same direction as a flow of the fluid within the interior.

19. The pipeline system of claim 18, wherein the one or more nozzles is selected from the group consisting of a continuous annular ring, a plurality of orifices, a plurality of slits, and any combination thereof.

20. The pipeline system of claim 17, wherein an upstream end of the raised section is chamfered.

* * * * *